United States Patent [19]
Stoll

[11] Patent Number: 5,440,833
[45] Date of Patent: Aug. 15, 1995

[54] INSECT PROTECTION BARRIER COMBINATION

[76] Inventor: Harris Stoll, 3298 Sugarbush Ter., Vista, Calif. 92084

[21] Appl. No.: 239,680

[22] Filed: May 9, 1994

[51] Int. Cl.⁶ .................... A01M 1/10; A01M 1/20
[52] U.S. Cl. ........................ 43/109; 43/121; 43/124; 43/132.1
[58] Field of Search .......... 43/109, 121, 124, 131, 43/132.1; 119/61

[56] References Cited

U.S. PATENT DOCUMENTS

| | | | |
|---|---|---|---|
| 2,356,022 | 8/1944 | Wright | 43/109 |
| 2,720,862 | 10/1955 | Davis | 119/61 |
| 2,959,354 | 11/1960 | Beck | 43/124 |
| 3,187,722 | 6/1965 | Gilmore | 119/61 |
| 3,979,854 | 9/1976 | Perkins | 43/121 |
| 4,497,131 | 2/1985 | Hicks | 43/131 |

FOREIGN PATENT DOCUMENTS

| | | | |
|---|---|---|---|
| 758966 | 7/1933 | France | 43/109 |
| 182710 | 7/1922 | United Kingdom | 43/109 |
| 372563 | 5/1932 | United Kingdom | 43/109 |

*Primary Examiner*—Kurt Rowan
*Attorney, Agent, or Firm*—John J. Murphey

[57] ABSTRACT

A combination insect protection barrier and tray upon which to support an object in an insect-free environment, including three barriers each including first and second upright closed loop walls having an open top and a closed bottom floor extending therebetween defining an endless annular cavity for receipt therein of a liquid insect repellant, the first wall being taller than the second wall and forming a vertical bore central thereto, a tray including three elongated elements of terminal length interconnected at their respective terminal ends and having a bore formed in the underside of the tray at each interconnection for receipt therein of the first wall of the barriers, and the three barriers and the tray formed as one unit in an injection molding mold and including runners from the tray to the barriers that may be broken away to allow assembly of the barriers in the tray.

11 Claims, 3 Drawing Sheets

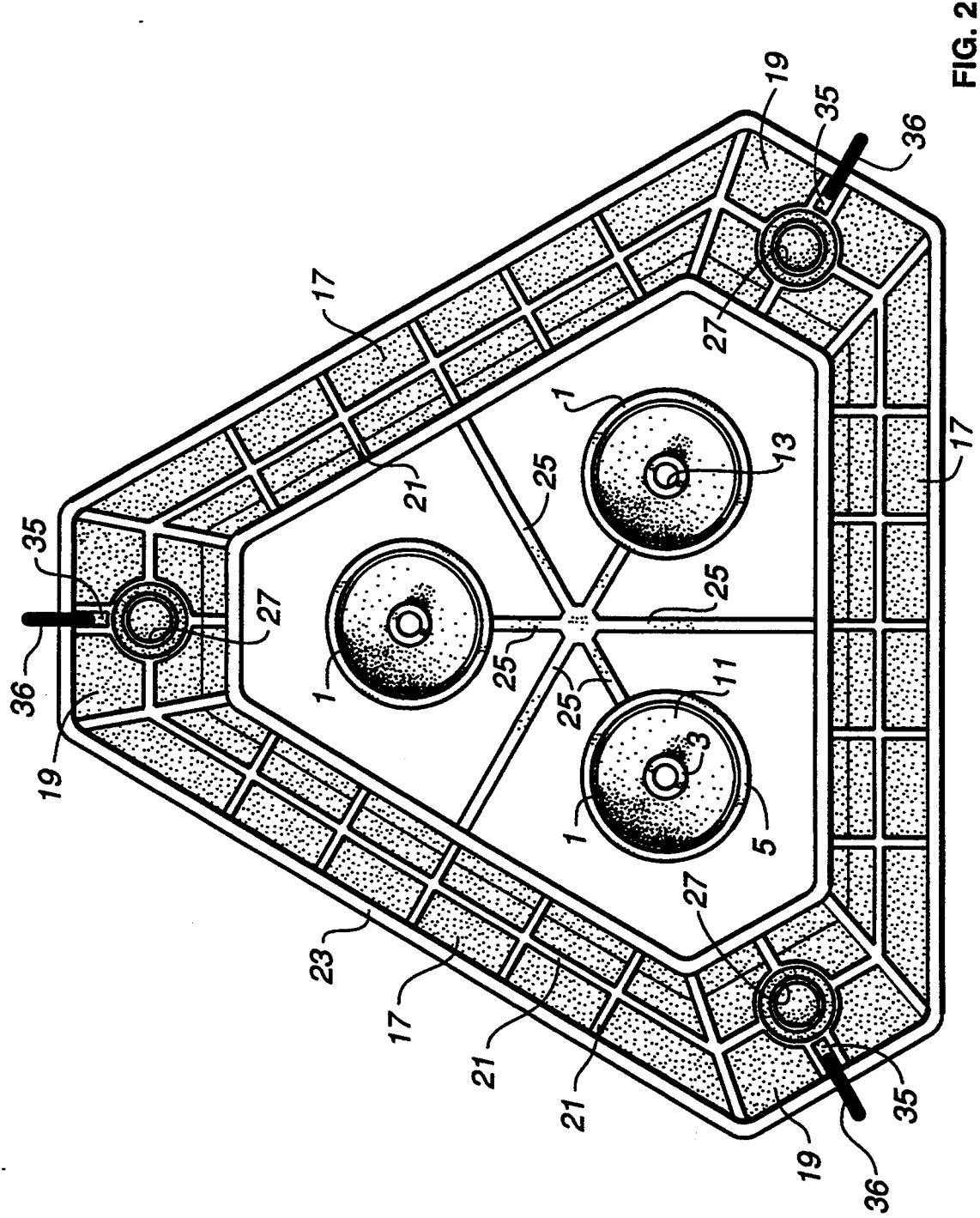

INSECT PROTECTION BARRIER COMBINATION

BACKGROUND OF THE INVENTION

1. Field of the Invention

This invention relates to the field of insect protection. More particularly, this invention relates to a device that creates a safe, economical and practical barrier between an item to be protected and insects that could crawl downward from an overhead surface or upward from below.

2. Description of the Prior Art

For centuries, insects have been an annoyance and a nuisance to humans. As necessary as insects are for the environment and the global ecosystem, they have not been well favored by human beings. Insects are passionately disfavored because they infest food items and are perceived as everyday pests and a source of annoyance and disgust. They infest plant life both in and out of the home and infest discards placed in garbage cans. Furthermore, insect infestation may pose health risks and problems as they are often disease carriers.

Many solutions for keeping insects away from items to be protected have been devised over the centuries. One solution known in the prior art is to fumigate an area to be protected with a spray, thereby depositing noxious fumes on or about an area of protection and leaving a toxic residue on or about the fumigated area. This often kills a number of insects and keeps them away from the protected subject matter. Although this method is somewhat effective, it has serious drawbacks. One of the drawbacks is the health risk to humans from toxic exposure. Exposure to toxins and noxious fumes often cause sickness and other undesirable health side effects. Another serious drawback is that small children, especially babies, put their fingers into the noxious materials. The same fingers travel into their mouths, thereby ingesting the toxins and putting themselves at a health risk or death. Household pets, such as cats and dogs, find their way into the repelling materials which bring about illness and/or death. Furthermore, this method of repelling insects is not one hundred percent effective because some insects escape unaffected, notwithstanding the exposure to toxic poisons. Additionally, the toxic poisons have a limited life expectancy. They are effective for a period of several hours or days, only to become spent and disregarded by the infesting insects over and over again, leaving humans with the toxic residual effects over time, but ineffective to solve the insect infestation.

SUMMARY OF THE INVENTION

This invention is a combination insect protection and tray upon which to support an object, such as a potted flower or a garbage can, in an insect-free environment. It is made in a unique design such that the barriers and support tray are manufactured as one unit in an injection molding operation. The barriers may be easily broken out of the molded combination and immediately used with the tray by filling them with liquid insecticide and then assembling them in the underside of the tray. The combination may be used in this configuration, i.e., setting the object on the tray and the tray on a supporting surface, like a porch or driveway, with the barriers underneath to prevent insects from crawling upward to reach the object, or, castered wheels may be inserted in the barriers to make the whole combination more easily moveable.

In another embodiment, a slightly different insect protection barrier and tray combination is provided where a link is inserted through the barrier for attachment to wires above and below to interpose the barrier between an overhanging supporting surface or overhang and the object-supporting tray. Thus it can be seen that this invention may be used to provide an insect-free environment for both hanging objects and ground-supported objects.

Accordingly, the main object of this invention is a combination insect protection barrier and support tray that may be easily and inexpensively manufactured in a single unit for breakdown and assembly so that it may be used to support objects that are ground-based or hung from overhead.

Other objects of the invention include an insect protection barrier that may accept castered wheels to make the support tray more easily moveable over the ground; that contains means in the tray for attachment to hanging wires so that it may be used for overhead plants and other objects; that provides for a weather cover to protect the liquid insecticide from dilution by the rain; and a combination made of thin walled-supported plastic to render the product light-weight, easily handleable, inexpensive, and easily cleaned.

These and other objects of the invention may be found from a close reading of the Description of the Preferred Embodiment taken along with the drawings appended hereto. The scope of protection sought by the inventors may be gleaned from a fair reading of the claims that conclude this Specification.

DESCRIPTION OF THE DRAWINGS

FIG. 2 is a bottom plan view of the embodiment shown in FIG. 1 without the castors and in its after-molded configuration;

DESCRIPTION OF THE PREFERRED EMBODIMENT

Figure 1:
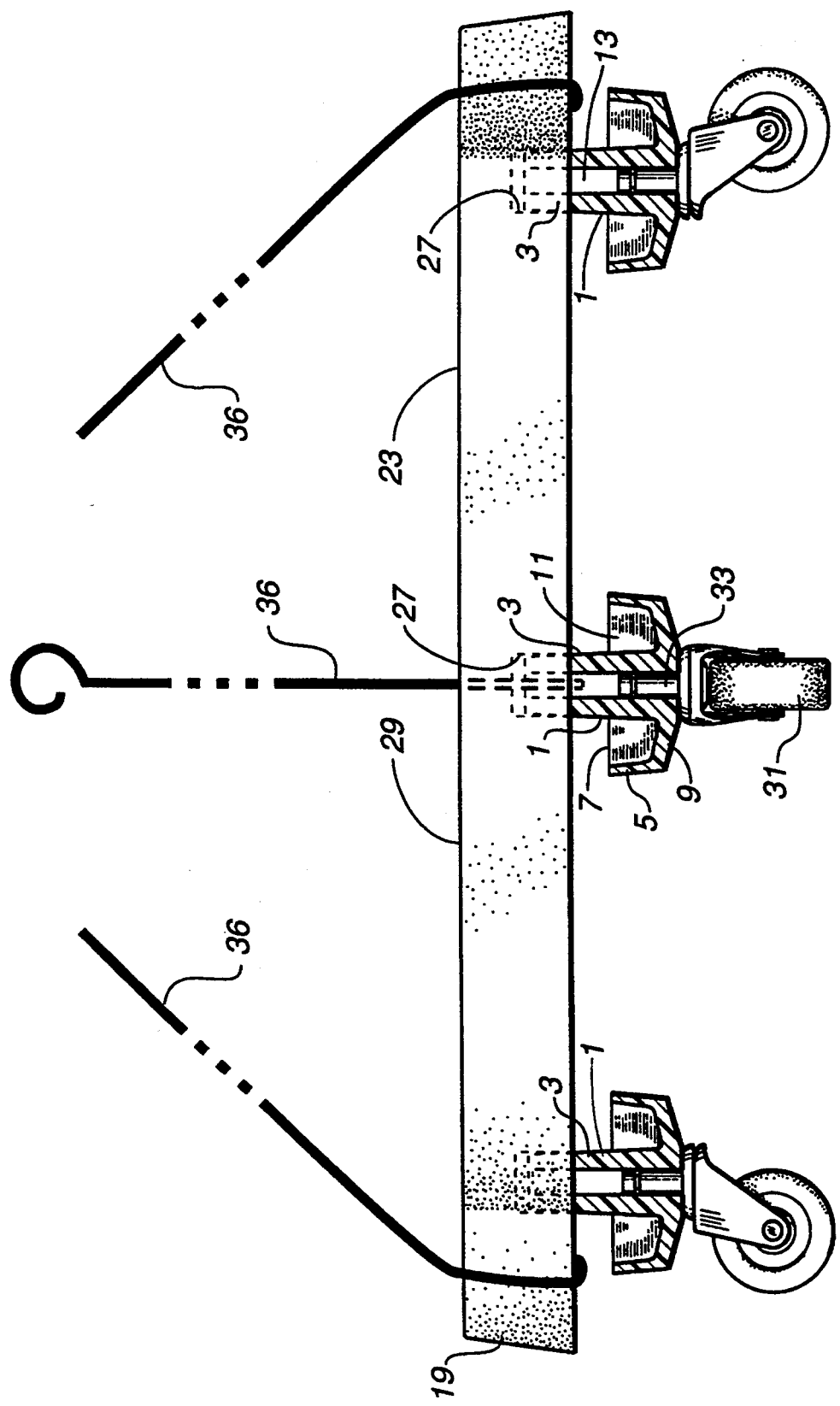
FIG. 1 is a side elevational view of the preferred embodiment of the combination of this invention.

Turning now to the drawings wherein like elements are identified with like numerals throughout the four figures, FIGS. 1 and 2 show the invention to comprise a combination insect protection barrier 1 made up of first inner wall 3 and second outer wall 5 arranged in upright position and having an open top 7 and a closed bottom floor 9 extending between walls 3 and 5 and defining therebetween an endless annular cavity 11 for receipt therein of a liquid insecticide. First wall 3 is taller than second wall 5 and forms a vertical bore 13 central thereto. Barrier 1 is preferably made of injection moldable plastic such as polyvinyl chloride or the like. Walls 3 and 5 should be at least ⅛ inch thick to withstand the rigors of handling with outer wall 5 being a minimum of 1¼ inches high or so and inner wall 3 being taller and a minimum of 1⅜ inches high or so. The space between the walls may vary, however, the further apart they are the greater volume of liquid insecticide or other insect repellant and the less maintenance or topping up is required. Motor oil is the preferred repellent in as much as it is found in abundance in most homes. It is non-toxic, very inexpensive, will not evaporate, and will not go rancid like vegetable oils. Two tablespoons of motor oil per cup will repel the insects and the cups can easily be cleaned with paint thinner, mineral spirits or even soap and water. Toxic insecticides last only a short period of time and must be repurchased. One filling of motor oil will last an entire season.

A tray is formed of three elongated elements or arms 17 each of terminal length and interconnected at their respective terminal ends to form junctions 19. Elements 17 are preferably formed as hollow members defined by a plurality of thin support walls 21 having a thin, overlying top and side cover wall 23 integral therewith. The tray may extend over barrier 1 to protect it from water. Such a construction lends itself to injection molding to provide an inexpensive but sturdy construction. As shown in FIG. 2, three barriers are formed along with one tray in the injection molding configuration, held therein by a series of runners 25 that may easily be broken away, following molding, to free the barriers for use with the tray.

A bore 27 is formed in the underside of tray 15 for receipt of taller first wall 3 in fixed position therein, as shown in FIG. 1. In this configuration an object such as a potted plant or a garbage can may be set upon the top side 29 of tray 15 and the tray supported above the ground with barriers 1. To make the combination more easily portable, castered wheels 31 may be added by inserting their stems 33 into bore 13.

An opening 35 may be formed at junctions 19 under the tray for receipt of a hook or other connector 36 when the tray is to be used to support an object that is hung from an overhead structure such as a roof member or an arbor.

Figure 4:
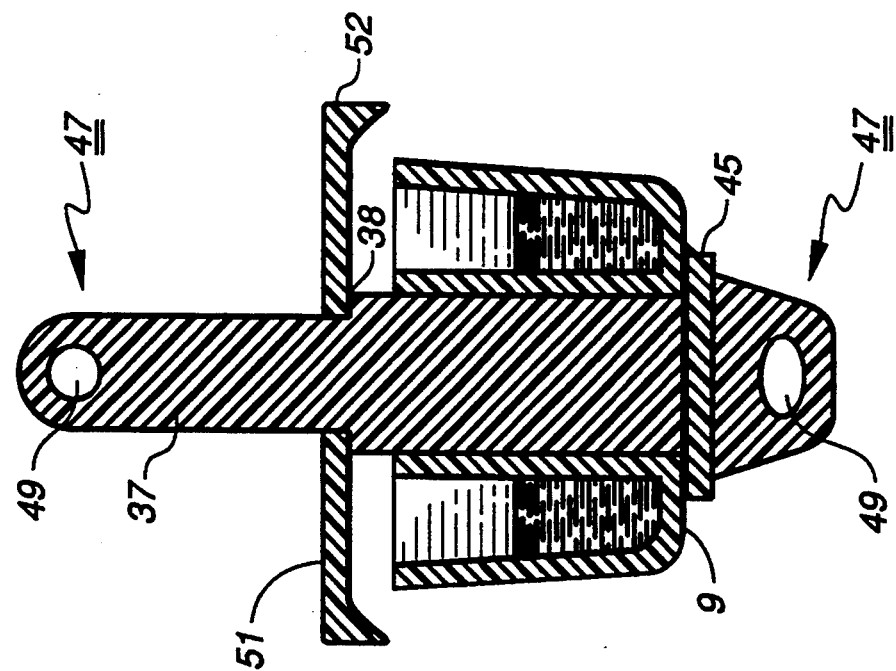
Figure 3:
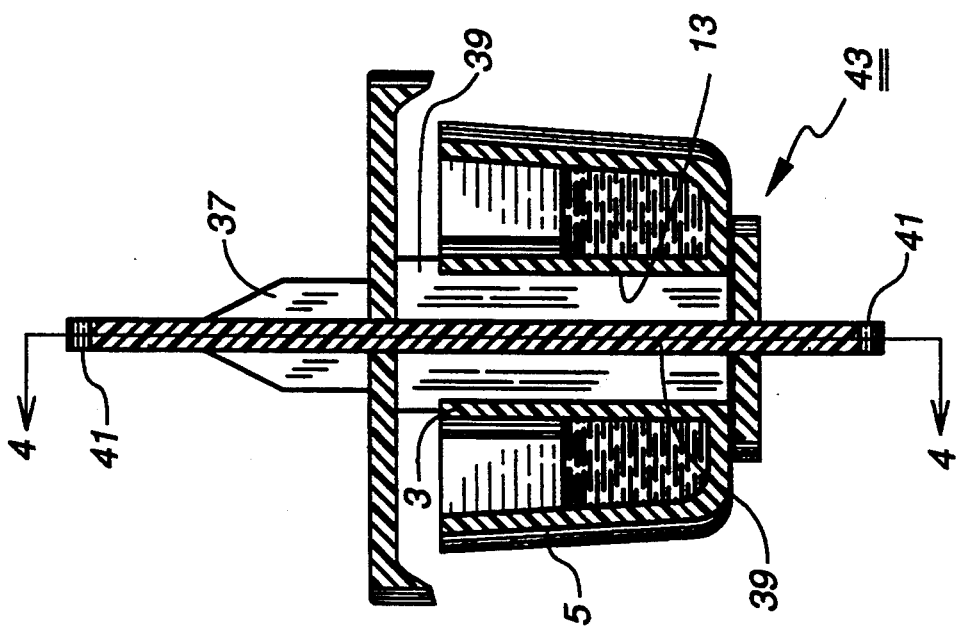
FIG. 3 is a side elevation sectional view of another embodiment of the insect barrier including a cross-section of the link body; and, FIG. 4 is another side elevation, sectional view taken along lines 4—4 in FIG. 3.

Another embodiment of the insect barrier 1 is shown in FIGS. 3 and 4 to comprise first and second walls 3 and 5 being of equal height. A link 37 is inserted into central bore 13. It is comprised of an elongated link body 39 of a size and shape to fit in bore 13, such as in the shape of a cross as shown in FIG. 3, and is terminated by spaced-apart distal ends 41 that extend above and below walls 3 and 5. Ends 41 include first means 43 for retaining link 37 in fixed position in bore 13. One form of means 43 is shown in FIGS. 3 and 4 to include a flange 45 extending outward from link body 39 below barrier floor 9 so as to support the barrier thereon.

Second means 47 is provided inboard from link ends 41 for interconnection with wire-like elements, such as string, chain, wire and the like, between an object to be supported a supporting overhead structure. It is preferred that link body 39 be made of lightweight yet strong plastic in a configuration, such as the "X" shape cross-section shown in FIGS. 3 and 4. One form of means 47 is shown in FIGS. 3 and 4 to be slots or apertures 49 formed through link 37.

A cover plate 51 may be conveniently placed in fixed position on link 37, on an abutment 38 formed in link 37, a spaced distance above said barrier and extended out beyond outer wall 5 and terminated at a circumferential lip 52 to prevent rain and snow from dropping into cavity 11 and diluting the insect repellant.

In operation, the barrier is interposed the object to be supported and the support structure, be it an overhanging structure or the ground, and filled with liquid repellant. An insect seeking access to the object must first crawl either up or down the outer or inner wall and traverse the surface of the liquid repellant and then crawl down or up the inner wall. In virtually all cases the repellant will deny access across its exposed surface.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are fully contemplated within the scope of this invention.

What is claimed is:

1. A combination insect protection barrier and tray upon which to support an object in an insect-free environment, comprising:
   a) three barriers each including first and second upright closed loop walls having an open top and a closed bottom floor extending therebetween defining an endless annular cavity for receipt therein of a liquid insect repellant, said first wall being taller than said second wall and forming a vertical bore central thereto; and,
   b) a tray including three elongated elements of terminal length interconnected at their respective terminal ends and having a bore formed in the underside of said tray at each said interconnection for receipt therein of said first wall of said barriers;
   c) said three barriers and said tray formed as one unit in an injection molding mold and including runners from said tray to said barriers that may be broken away to allow assembly of said barriers in said tray.

2. The combination of claim 1 further including castered wheels inserted in the central bore of said barriers to allow said combination to be rolled over a flat surface.

3. The combination of claim 1 further including an opening formed under said tray at each said intersection for receipt therein of hook means for attaching to a line to hang said tray from an overhead structure.

4. The combination of claim 1 wherein said elongated elements are hollow and are defined by a plurality of thin support walls having a solid top cover integral therewith.

5. (Amended) An insect protection barrier comprising:
   a) first and second upright closed loop walls having an open top and a closed bottom floor extending therebetween defining an endless annular cavity for receipt therein of a liquid insect repellant, said first wall forming a vertical bore central thereto;
   b) a link, comprising an elongated "X" shaped cross-sectional body, of a size and shape to fit snugly in said bore and terminated by distal ends that extend above and below said walls when assembled therewith and including first means for retaining said link in fixed position in said bore;
   c) second means located inboard from each said distal ends of said link for interconnection with wire-like elements to position said barrier between an object and a supporting overhanging structure.

6. The barrier of claim 5 further including a cover plate centrally positioned on said link, spaced above and extending out over said open top of said cavity terminating in a downwardly extending circumferential lip to shed water and snow therefrom so as to prevent influx of water into said cavity.

7. A combination insect protection barrier and tray upon which to support an object in an insect-free environment, comprising:
   a) first and second upright closed loop walls having an open top and a closed bottom floor extending therebetween defining an endless annular cavity for receipt therein of a liquid insect repellant, said first wall forming a vertical bore central thereto;
   b) a link comprising an elongated body of a size and shape to fit in said bore, and terminated by distal ends that extend above and below said walls when assembled therewith and including first means for retaining said link in fixed position in said bore;
   c) second means located inboard from each said distal ends of said link for interconnection with wire-like elements to position said barrier between an object and a supporting overhanging structure; and,
   d) a tray including three elongated elements or terminal length interconnected at their respective terminal ends and having a bore formed in the underside of said tray at each said interconnection for receipt therein of said first wall of said barriers;
   e) said three barriers and said tray formed as one unit in an injection molding mold and including runners from said tray to said barriers that may be broken away to allow assembly of said barriers in said tray.

8. The combination of claim 7 wherein said elongated elements are hollow and are defined by a plurality of thin support walls having a solid top cover integral therewith.

9. The combination of claim 7 wherein said first means includes a flange extending outward from said link body beyond said bore for supporting said first and second walls thereon.

10. The combination of claim 7 wherein said link body has an "X" shaped cross-section.

11. The combination of claim 7 further including a cover plate centrally positioned on said link, spaced above and extending over said open top of said cavity.

* * * * *